(12) United States Patent
Page

(10) Patent No.: US 11,565,811 B1
(45) Date of Patent: Jan. 31, 2023

(54) BLENDED WING BODY AIRCRAFT WITH TRANSPARENT PANELS

(71) Applicant: Blended Wing Aircraft, Inc., Orange, CA (US)

(72) Inventor: Mark Allan Page, Orange, CA (US)

(73) Assignee: Blended Wing Aircraft, Inc., Orange, CA (US)

( * ) Notice: Subject to any disclaimer, the term of this patent is extended or adjusted under 35 U.S.C. 154(b) by 0 days.

(21) Appl. No.: 17/586,988

(22) Filed: Jan. 28, 2022

(51) Int. Cl.
| | |
|---|---|
| *B64C 39/10* | (2006.01) |
| *B64C 1/14* | (2006.01) |
| *B64D 47/02* | (2006.01) |
| *B64C 1/06* | (2006.01) |
| *B60Q 3/43* | (2017.01) |
| *B64D 11/00* | (2006.01) |

(52) U.S. Cl.
CPC .............. *B64C 39/10* (2013.01); *B60Q 3/43* (2017.02); *B64C 1/06* (2013.01); *B64C 1/1484* (2013.01); *B64D 47/02* (2013.01); *B64C 2039/105* (2013.01); *B64D 2011/0038* (2013.01); *B64D 2203/00* (2013.01)

(58) Field of Classification Search
CPC ......... B64C 39/10; B64C 1/06; B64C 1/1484; B64C 2039/105; B60Q 3/43; B64D 47/02; B64D 2011/0038; B64D 2203/00
See application file for complete search history.

(56) References Cited

U.S. PATENT DOCUMENTS

| | | | |
|---|---|---|---|
| 7,535,614 B1 * | 5/2009 | Tapley | ........................ B60J 3/04 359/275 |
| 7,564,468 B2 | 7/2009 | Sanford | |
| 8,087,615 B2 | 1/2012 | Wood | |
| 9,688,397 B2 | 6/2017 | Smith | |
| 10,349,489 B2 | 7/2019 | Robinson et al. | |
| 10,427,599 B2 | 10/2019 | Di Trapani et al. | |
| 2004/0217234 A1 * | 11/2004 | Jones | ..................... A61M 21/02 244/118.5 |
| 2016/0052446 A1 * | 2/2016 | Frey | ......................... B60J 7/043 349/16 |
| 2018/0182314 A1 * | 6/2018 | Staton | ........................ E06B 9/24 |
| 2019/0202349 A1 * | 7/2019 | Winton | ............... B60R 11/0235 |
| 2019/0264023 A1 * | 8/2019 | Sakai | ....................... C08L 67/04 |

FOREIGN PATENT DOCUMENTS

| | | |
|---|---|---|
| CN | 101580121 A | 11/2009 |
| CN | 202686752 U | 1/2013 |
| CN | 205131647 U | 4/2016 |

OTHER PUBLICATIONS

Dzyne Tech, Ascent 1000 Blended Wing Body, Oct. 1, 2018.
Lee Aerospace, Cessna Chooses Lee Aerospace Coolview Windows for Citation CJ4 Gen2 Aircraft, Mar. 3, 2021.
Dassault, Dassault's New Falcon 5X Feature an SPD-Smart Skylight, Oct. 23, 2013.

* cited by examiner

*Primary Examiner* — Valentina Xavier
(74) *Attorney, Agent, or Firm* — Caldwell Intellectual Property Law

(57) ABSTRACT

The present disclosure is directed to a blended wing body aircraft including a blended wing body, wherein the blended wing body is characterized by having no clear dividing line between wings and a main body along a leading edge of the aircraft; a cabin located within the main body and a transitional portion of the blended wing body; and a plurality of transparent panels in a ceiling of the cabin configured to transmit light from outside the blended wing body aircraft to inside the cabin.

19 Claims, 6 Drawing Sheets

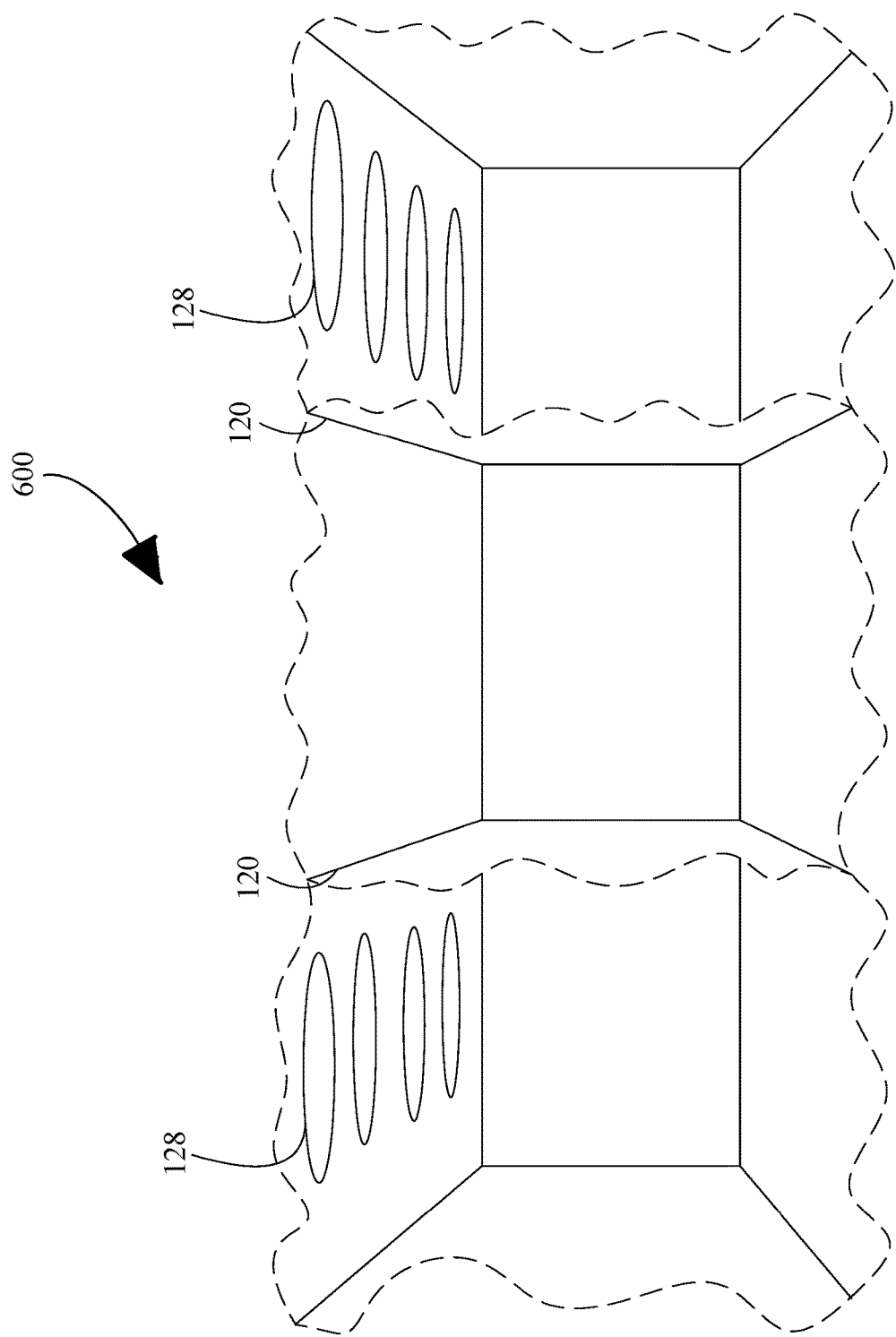

BLENDED WING BODY AIRCRAFT WITH TRANSPARENT PANELS

FIELD OF THE INVENTION

The present invention generally relates to the field of blended wing body aircraft. In particular, the present invention is directed to a blended wing body aircraft with transparent panels.

BACKGROUND

Blended wing body aircraft provide efficiencies that are not realized with other types of aircraft. However, the limited windows can provide a claustrophobic and unenjoyable experience for passengers.

SUMMARY OF THE DISCLOSURE

In an aspect of the present disclosure is a blended wing body aircraft including a blended wing body, wherein the blended wing body is characterized by having no clear dividing line between wings and a main body along a leading edge of the aircraft; a cabin located within the main body and a transitional portion of the blended wing body; and a plurality of transparent panels in a ceiling of the cabin configured to transmit light from outside the blended wing body aircraft to inside the cabin.

In another aspect of the present disclosure is a blended wing body aircraft including a blended wing body, wherein the blended wing body is characterized by having no clear dividing line between wings and a main body of the aircraft; a cabin located within the main body and a transitional portion of the blended wing body; a plurality of transparent panels in a ceiling of the cabin, wherein the plurality of transparent panels are configured to transmit daylight from outside the blended wing body aircraft to inside the cabin; and a plurality of channels in the cabin, wherein: the plurality of transparent panels are included in channels of the plurality of channels; and at least two of the channels that include panels of the plurality of transparent panels are separated by and adjacent to at least a channel of the plurality of adjacent channels that does not contain any transparent panels.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 illustrates a cabin in an exemplary blended wing aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a blended wing body aircraft with transparent panels. In an embodiment, a blended wing body aircraft includes a plurality of transparent panels on the cabin ceiling. The ceiling may have recesses corresponding to the plurality of transparent panels. The plurality of transparent panels may be configured to illuminate in different colors. In some embodiments, the plurality of transparent panels may be configured to display images such as landscapes, text, and motion pictures. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "top," "bottom," "vertical," "horizontal," and derivatives thereof relate to embodiments oriented as shown for exemplary purposes in FIG. 4. Furthermore, there is no intention to be bound by any expressed or implied theory presented in this disclosure.

Figure 1:
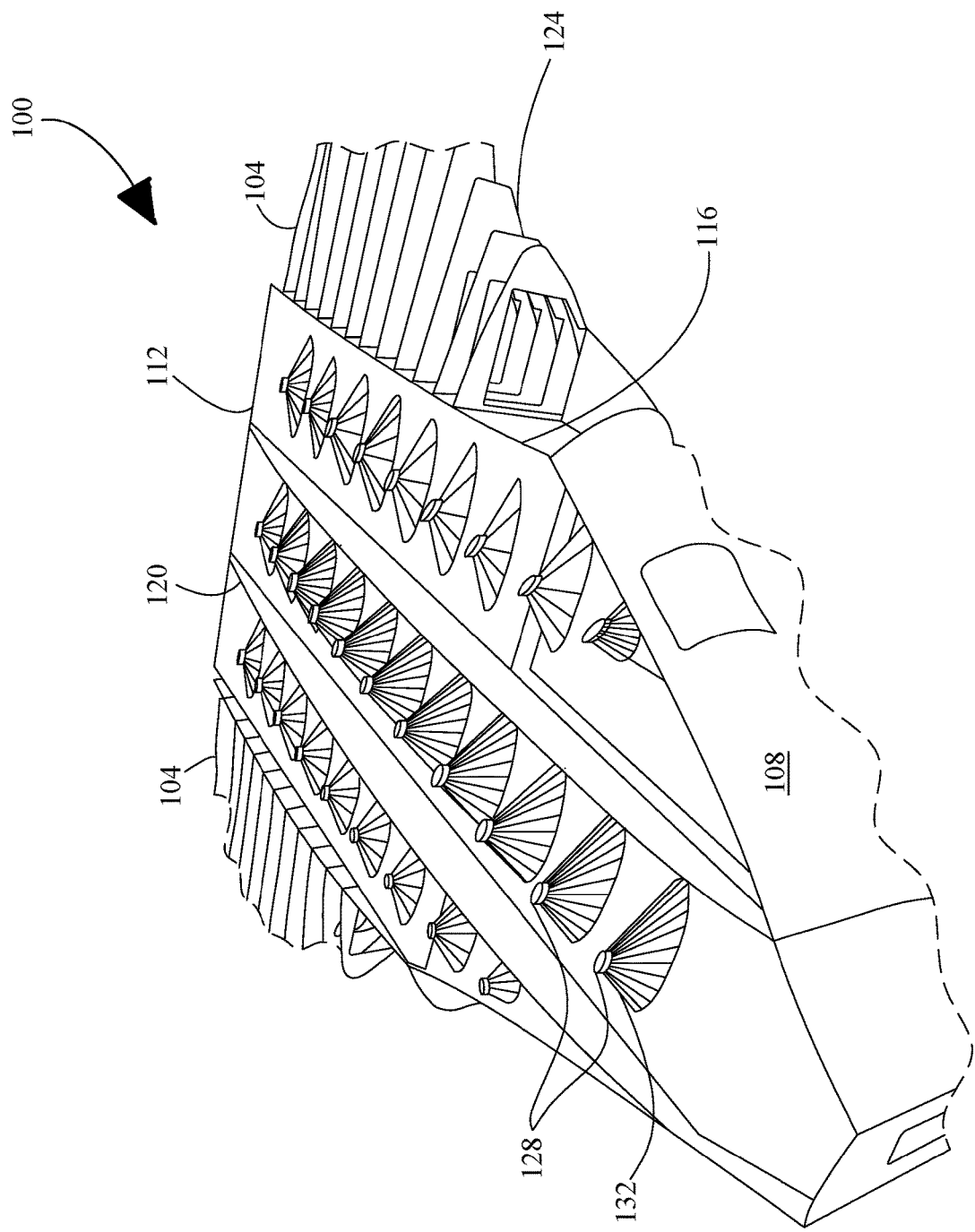
FIG. 1 is a schematic illustration of an exemplary blended wing aircraft.

Referring now to FIG. 1, a blended wing body aircraft 100 is illustrated. As used in this disclosure, A "blended wing body" aircraft (BWB), also known as a "blended body" or a "hybrid wing body" (HWB), is a fixed-wing aircraft having no clear dividing line between wings and a main body of the aircraft at a leading edge of the wings 104. As used in this disclosure, "wings" are a type of fin structures which include one or more airfoils configured to create a pressure differential resulting in lift. Wings are generally disposed on the left and right sides of the aircraft symmetrically, at a point between nose and empennage. For example, a BWB aircraft may have distinct wing and body structures, which are smoothly blended together with no clear dividing line or demarcation between wing 104 and main body 108. This contrasts with a flying wing, which has no distinct main body, and a lifting body, which has no distinct wings. A "fuselage," for the purposes of this disclosure, refers to a main body of an aircraft 400, or in other words, an entirety of an aircraft except for nose, wings, empennage, nacelles, and control surfaces. A BWB design may or may not be tailless. One of the main advantages of the BWB is to reduce wetted area and the accompanying form drag associated with a conventional wing-body junction. It may also be given a wide airfoil-shaped body, allowing the entire craft to generate lift and thus reducing the size and drag of the wings. It should be noted by one of ordinary skill in the art that there is a plurality of designs of BWB aircraft that may be applied in embodiments of this disclosure. The BWB is a hybrid shape that resembles a flying wing, but also incorporates features from conventional transport aircraft. This combination offers several advantages over conventional tube—and wing airframes. The BWB airframe merges efficient high-lift wings with a wide airfoil-shaped body, allowing the entire aircraft to generate lift and minimize drag. This shape helps to increase fuel economy and creates larger payload (cargo or passenger) areas in the center body portion of the aircraft. The BWB shape allows unique interior designs. Cargo may be loaded or passengers may board from the front or rear of the aircraft. The cargo or passenger area may be distributed across the wide main body, providing a large usable volume. For passengers in the interior of the craft, real-time video at every seat may take the place of window seats. Aircraft 100 may include a cabin 112, which is the section of the aircraft 100 in which passengers travel. Cabin 112 may be located in main body 108 and may also be located in part of wings 104, specifically a transitional portion of aircraft 100. As used in this disclosure, a "transitional portion" of an BWB is the portion where the wings transition to main body. Cabin 112 may include a ceiling 116.

Still referring to FIG. 1, aircraft 100 may include ribs 120 and spars 124. As used in this disclosure, a "rib" is a forming element of a wing or a fuselage. In a fuselage of a BWB, ribs may run longitudinally from fore to aft in and form the shape of the fuselage. As used in this disclosure, a "spar" is a structural member of a wing or a fuselage that runs perpendicular to ribs. Ribs 120 in main body 108 and transitional portion may define separate channels in cabin 112. Structural elements of aircraft 100 are described in detail below.

With continued reference to FIG. 1, wings 104 may comprise a plurality of geometries in planform view, swept swing, tapered, variable wing, triangular, oblong, elliptical, square, among others. Wings 104 may be blended into the body of the aircraft such as in a BWB aircraft where no strong delineation of body and wing exists. A wing's cross section geometry comprises an airfoil. An "airfoil" as used in this disclosure, is a shape specifically designed such that a fluid flowing above and below it exert differing levels of pressure against the top and bottom surface. In embodiments, the bottom surface of an aircraft can be configured to generate a greater pressure than does the top, resulting in lift. A wing may comprise differing and/or similar cross-sectional geometries over its cord length or the length from wing tip to where wing meets the aircraft's body. One or more wings 104 may be symmetrical about the aircraft's longitudinal plane, which comprises the longitudinal or roll axis reaching down the center of the aircraft through the nose and empennage, and the plane's yaw axis. Wings 104 may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may be disposed on wings 104 in a plurality of locations and arrangements and in embodiments may be disposed at the leading and trailing edges of wings 104, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 includes a plurality of transparent panels 128 in ceiling 116 of cabin 112. An exterior surface of plurality of transparent panels 128 may be flush with aircraft skin. Ceiling 116 may include a recess 132 corresponding to each of plurality of transparent panels 128. Recess 132 may be conical, cylindrical, pyramidal, or any other shape. Recess 132 may include a gradual recession toward aircraft skin such that there is no clear demarcation between ceiling 116 and recess 132. Recess 132 may include a reflective surface. Ceiling 116 may include retractable shades and/or retractable covers positioned over plurality of transparent panels 128. Retractable shades and/or retractable covers may cover recesses 132 and may be flush with ceiling 116. Retractable shades and/or retractable covers may be positioned within recess 132 and may be adjacent to plurality of transparent panels 128. Retractable shades and/or retractable covers may be mounted within recess 132. Actuators may be attached to retractable shades and/or retractable covers to adjust, open, and/or close them. Plurality of transparent panels 128 may be on side walls of cabin 112. In some embodiments, plurality of transparent panels 128 may be on floor of cabin 112.

With continued reference to FIG. 1, plurality of transparent panels 128 are configured to transmit daylight from outside aircraft 100 to inside cabin 112. Plurality of transparent panels 128 may be made of plexiglass including, but not limited to, Lexan polycarbonate, acrylic plastics including stretched acrylic, reinforced glass, and/or any material known by one skilled in the art that is suitable for aircraft windows. An outer surface of plurality of transparent panels 128 may be flush with aircraft skin. Plurality of transparent panels 128 may each include one or more panes. For example, plurality of transparent panels 128 may include an outer pane that is approximately flush with aircraft skin. Plurality of transparent panels 128 may also include a scratch pane contacting an interior atmosphere in aircraft 100 and at least an inner pane between the outer pane and the scratch pane. Inner pane may include a small hole to gradually equalize air pressure on either side of the inner pane. In some embodiments, plurality of transparent panels 128 may include a reinforced glass pane, a heating/deicing element, a vinyl layer, and/or another reinforced glass pane. Plurality of transparent panels 128 may include spacers between panes. Plurality of transparent panels 128 may be of various shapes including circle, oval, oblong, elliptical, rectangle including square, triangle, pentagon, hexagon, any other polygon, and/or any irregular shape. Plurality of transparent panels 128 may be grouped together. Plurality of transparent panels 128 may form rows and/or columns, which may be parallel. In some embodiments, plurality of transparent panels 128 may be evenly separated. Plurality of transparent panels 128 may be positioned adjacent to each other provide an undisrupted view. Plurality of transparent panels 128 may be positioned to form a grid. Plurality of transparent panels 128 may provide many benefits. For example, plurality of transparent panels 128 may reduce the weight of aircraft 100. Plurality of transparent panels 128 may also provide additional natural light to passengers and provide a more open and spacious feel. Plurality of transparent panels 128 may be in multiple channels in cabin 112 including non-adjacent channels. For example, at least two ribs 120 and a channel may be between a first of plurality of transparent panels 128 and a second of plurality of transparent panels 128. There may be a plurality of pairs of adjacent channels including channels with plurality of transparent panels 128 and channels without any transparent panels 128.

Still referring to FIG. 1, plurality of transparent panels 128 may be tinted to reduce the amount of light, such as daylight, passing through the plurality of transparent panels 128 from outside aircraft 100 into cabin 112, which may also help control air temperature inside cabin 112. Tints may include dyed tints, metalized tints, hybridized dyed and metalized tints, carbon tints, ceramic tints, crystalline tints wherein the panel remains transparent, and/or the like. Plurality of transparent panels 128 may have light filters such as polarizing, UVA, UVB, and/or ultraviolet filters. Tints and/or filters may be on one or more surfaces of plurality of transparent panels 128. For example, tints and/or filters may be on one or both sides of a pane and/or on one or more panes. Plurality of transparent panels 128 may be clear. In some embodiments, plurality of transparent panels 128 may have one or more colors. Plurality of transparent panels 128 may be translucent and/or frosted. Translucent panels may allow for high transmission of light, while introducing scatter. Translucent panels may have one or more of a turbid medium or construction (e.g., transparent plastic with air bubbles) and a rough surface finish (e.g., bead blasted), configured to introduce scatter. In some cases, translucency may be modulated. Plurality of transparent panels 128 may include privacy glass, also known as switchable glass, which is interchangeable between transparency, translucency, and/or opacity by applying a current. Privacy glass may include a liquid crystal display between two layers of film, such as polyethylene terephthalate (PET), glass, polycarbonate, and/or acrylic. Privacy glass may be configured to receive an electric current and change from transparent to translucent by altering the applied current. For example, the liquid crystals align when an electric current, such as direct current (DC) and/or alternating current (AC), is applied to the liquid crystals causing the display and glass to become transparent. When the current is not applied, the liquid crystals may return to scattered positions causing the display and glass to become opaque and/or translucent. Plurality of transparent panels 128 may include windows configured to change color and/or shading by altering an application of electric current, such as DC and/or AC, to the plurality of transparent panels 128. For example, plurality of transparent panels 128 may include electrochromic materials such as tungsten oxide film that may transition from transparent to deep blue based on altering the application of an electric current to the film.

Plurality of transparent panels 128 may be illuminated by one or more light sources such as light emitting diodes (LEDs), fiber optics, and/or the like. Plurality of transparent panels 128 may include LED matrix, for example a red/green/blue (RGB) LED matrix panel, configured to radiate one or more colors, thus providing that plurality of transparent panels 128 may illuminate one or more colors. LED matrix may include a filter matrix. Plurality of transparent panels 128 may be front-lit by one or more light sources in cabin 112 and/or plurality of transparent panels 128 may be backlit by one or more light sources positioned exterior to at least a portion of the plurality of transparent panels 128. One or more lights sources may be between panes in plurality of transparent panels 128. In some embodiments, one or more light sources may be around the perimeter of plurality of transparent panels 128. Plurality of transparent panels 128 may be configured to display images such as moving pictures, designs, text, landscapes, and/or the like from one or more light sources. Each of plurality of transparent panels 128 may be configured to show an identical display. Plurality of transparent panels 128 may display distinct images. Plurality of transparent panels 128 may be configured for images to spread across some or all of plurality of transparent panels 128. For example, text may move from one of plurality of transparent panels 128 to a neighboring of plurality of transparent panels 128.

With continued reference to FIG. 1, aircraft 100 may include a controller communicatively connected to plurality of transparent panels 128. "Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of controller. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Controller may be configured to apply and control current to plurality of transparent panels 128 comprising privacy glass to adjust the transparency, translucency, and/or opacity of the plurality of transparent panels 128. Controller may be configured to control one or more light sources as discussed above and the lighting of plurality of transparent panels 128. For example, controller may be configured to adjust the color, images, designs, texts, moving pictures, and/or the like on plurality of transparent panels 128. Controller may be configured to control each of plurality of transparent panels 128 individually, in groups, and/or all in unison. Controller may be communicatively connected to actuators attached to retractable shades and/or retractable cover to control them.

Controller may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller may include a single computing device operating independently, or may include two or more computing device operating in concert, in parallel, sequentially or the like; two or more computing devices may be included together in a single computing device or in two or more computing devices. Controller may interface or communicate with one or more additional devices as described below in further detail via a network interface device. Network interface device may be utilized for connecting controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller may include but is not limited to, for example, a computing device or cluster of computing devices in a first location and a second computing device or cluster of computing devices in a second location. Controller may include one or more computing devices dedicated to data storage, security, distribution of traffic for load balancing, and the like. Controller may distribute one or more computing tasks as described below across a plurality of computing devices of computing device, which may operate in parallel, in series, redundantly, or in any other manner used for distribution of tasks or memory between computing devices. Controller may be implemented using a "shared nothing" architecture in which data is cached at the worker, in an embodiment, this may enable scalability of system 100 and/or computing device.

With continued reference to FIG. 1, controller may be designed and/or configured to perform any method, method step, or sequence of method steps in any embodiment described in this disclosure, in any order and with any degree of repetition. For instance, controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
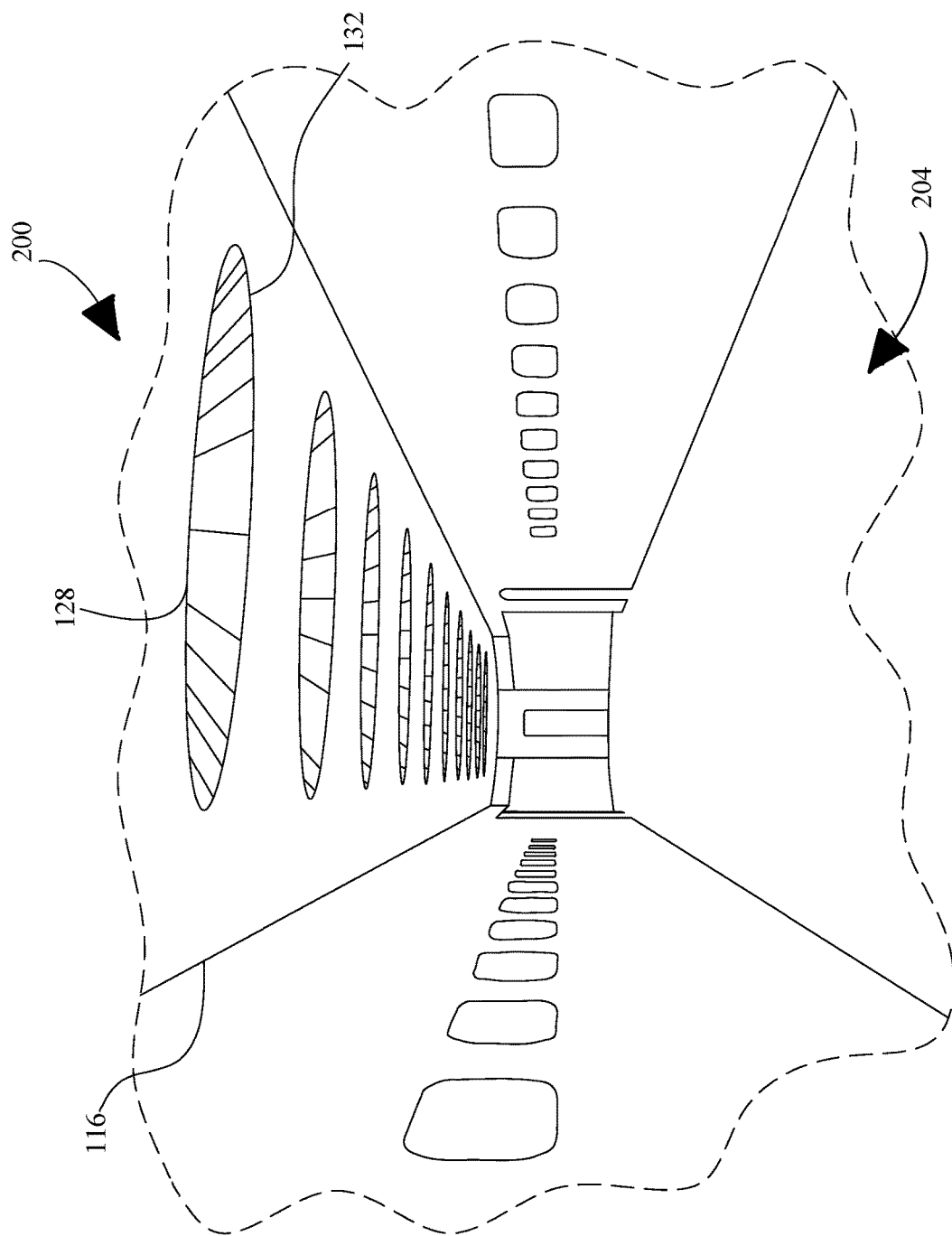
FIG. 2 illustrates a cabin in an exemplary blended wing aircraft.

Now referring to FIG. 2, a cabin 200 is illustrated. As shown in this figure, plurality of transparent panels 128 are arranged in a row along a channel 204, and the plurality of transparent panels 128 are in recesses 132 in ceiling 116.

Figure 3:
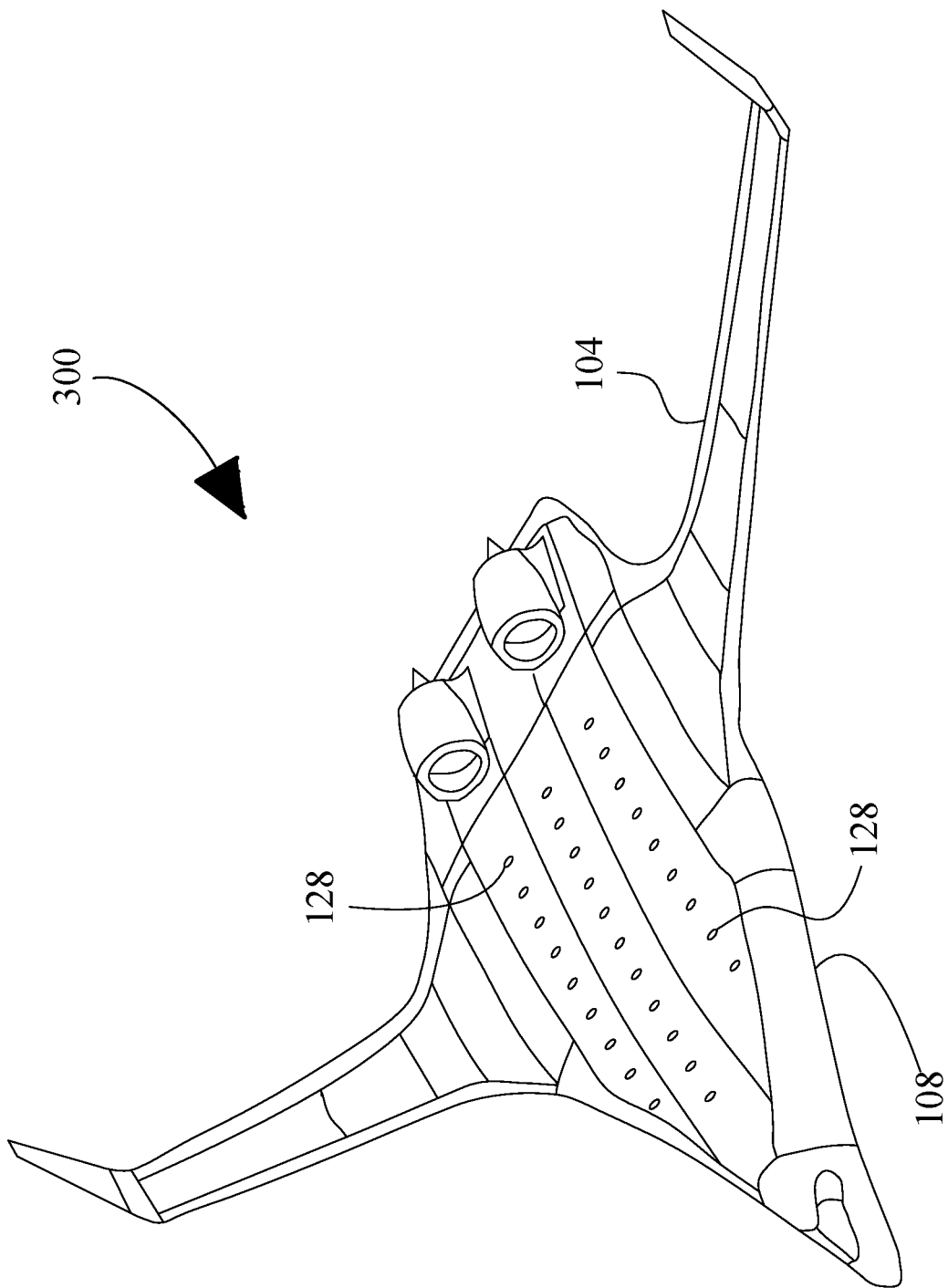
FIG. 3 is a perspective view of an exemplary blended wing aircraft.

Now referring to FIG. 3, an exemplary blended wing body aircraft 300 is illustrated. Aircraft 300 includes wings 104 that transition smoothly to main body 108. On the top surface of main body are plurality of transparent panels 128. As shown in this figure, plurality of transparent panels 128 may be arranged in three rows from fore to aft.

Figure 4:
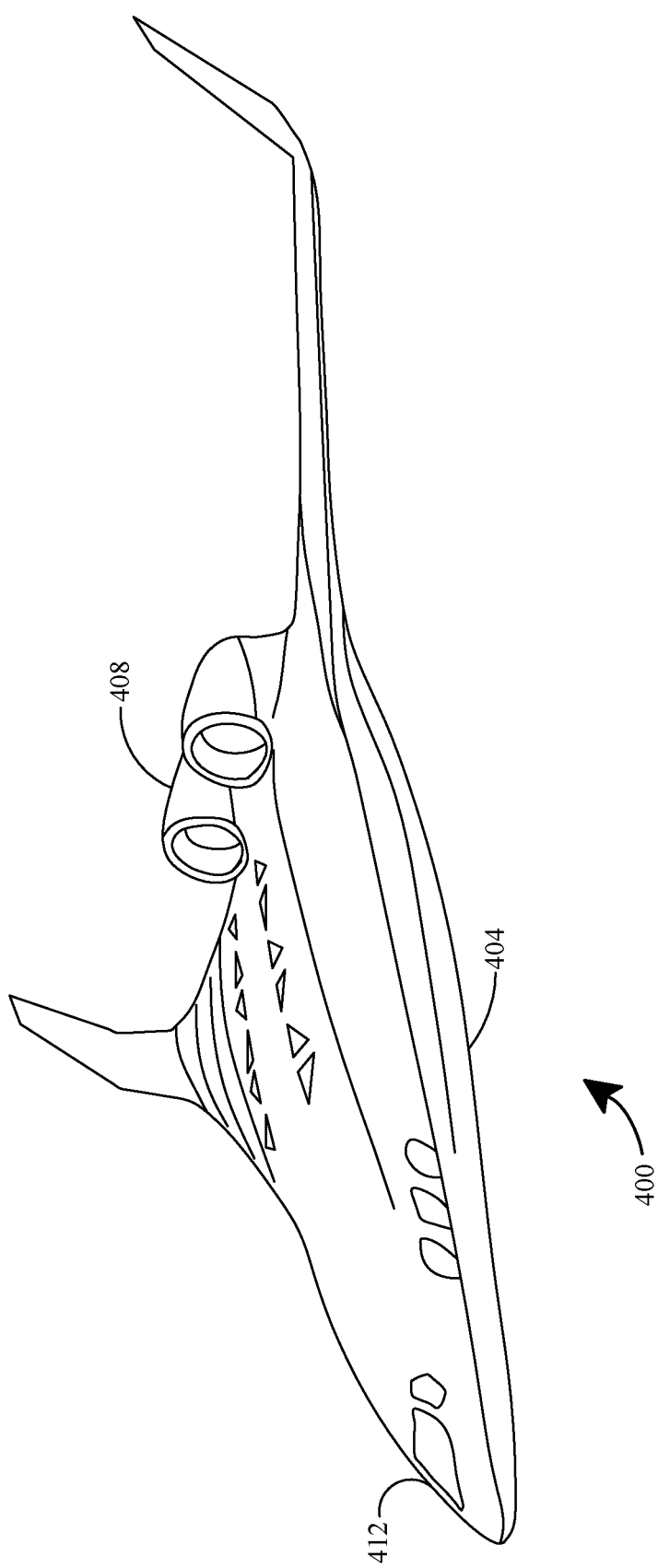
FIG. 4 is a schematic of an exemplary blended wing aircraft.

Referring to FIG. 4, an exemplary blended wing aircraft 400 is illustrated. Aircraft 400 may include a blended wing body 404. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft. For example, a BWB 404 aircraft may have distinct wing and body structures, which are smoothly blended together with no clear dividing line or boundary feature between wing and main body. This contrasts with a flying wing, which has no distinct main body, and a lifting body, which has no distinct wings. A BWB 404 design may or may not be tailless. One potential advantage of a BWB 404 may be to reduce wetted area and any accompanying drag associated with a conventional wing-body junction. In some cases, a BWB 404 may also have a wide airfoil-shaped body, allowing entire aircraft to generate lift and thereby facilitate reduction in size and/or drag of wings. In some cases, a BWB 404 may be understood as a hybrid shape that resembles a flying wing, but also incorporates features from conventional aircraft. In some cases, this combination may offer several advantages over conventional tube-and-wing airframes. In some cases, a BWB airframe 404 may help to increase fuel economy and create larger payload (cargo or passenger) volumes within the BWB. BWB 404 may allow for advantageous interior designs. For instance, cargo can be loaded and/or passengers can board from the front or rear of the aircraft. A cargo or passenger area may be distributed across a relatively wide (when compared to conventional tube-wing aircraft) main body, providing a large usable volume. In some embodiments, passengers seated within an interior of aircraft, real-time video at every seat can take place of window seats.

With continued reference to FIG. 4, BWB 404 of aircraft 400 may include a nose portion. A "nose portion," for the purposes of this disclosure, refers to any portion of aircraft 400 forward of the aircraft's fuselage 416. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 4, BWB 404 may include at least a structural component of aircraft 400. Structural components may provide physical stability during an entirety of an aircraft's 400 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 400 structure, they may be so named A, B, C, and so on named from nose to tail. Pillars, like any structural element, may be disposed a distance away from each other, along an exterior of aircraft 400 and BWB 404. Depending on manufacturing method of BWB 404, pillars may be integral to frame and skin, comprised entirely of internal framing, or alternatively, may be only integral to structural skin elements. Structural skin will be discussed in greater detail below.

With continued reference to FIG. 4, BWB 404 may include a plurality of materials, alone or in combination, in its construction. At least a BWB 404, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 404 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 404 may additionally or alternatively use wood or another suitably strong yet light material for an internal structure.

With continued reference to FIG. 4, aircraft 400 may include monocoque or semi-monocoque construction. BWB 404 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 4, BWB 404 may include at least a fuselage. A fuselage may refer to a main body of an aircraft 400, or in other words, an entirety of the aircraft 400 except for nose, wings, empennage, nacelles, and control surfaces. In some cases, fuselage may contain an aircraft's payload. At least a fuselage may comprise structural components that physically support a shape and structure of an aircraft 400. Structural components may take a plurality of forms, alone or in combination with other types. Structural components vary depending on construction type of aircraft 400 and specifically, fuselage. A fuselage 412 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 4, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 400. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 400 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 4, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

Still referring to FIG. 4, in some embodiments, transparent panels may be located within frames (i.e., space formed between structural elements). In some cases, a relationship between number of frames per transparent panel may be a design parameter that affects weight of the aircraft, as well as passenger comfort. In some cases, number of frames per transparent panel may be 1, 2, 3, 4, 5, 6, 7, 8, 9, or 10 frames per transparent panel. By placing transparent panels in fewer than every available frame, an aircraft may save on weight (and related performance), while maintaining passenger comfort and access to natural light. Additional disclosure related to transparent panel placement relative structural components may be found with reference to FIG. 6, below.

With continued reference to FIG. 4, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 4, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 404. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 4, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 400 is in its level flight orientation or sitting on ground. A post may act similarly to stringer in that it is configured to support axial loads in compression due to a load being applied parallel to its axis due to, for example, a heavy object being placed on a floor of aircraft 400. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 4, aircraft 400 may include at least a flight component 408. A flight component 408 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 400 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 400. In some embodiments, at least a flight component 408 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 4, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 4, at least a flight component may be one or more devices configured to affect aircraft's 400 attitude. "Attitude," for the purposes of this disclosure, is the relative orientation of a body, in this case aircraft 400, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 400. A plurality of attitude datums may indicate one or more measurements relative to an aircraft's pitch, roll, yaw, or throttle compared to a relative starting point. One or more sensors may measure or detect an aircraft's 400 attitude and establish one or more attitude datums. An "attitude datum," for the purposes of this disclosure, refers to at least an element of data identifying an attitude of an aircraft 400.

With continued reference to FIG. 4, in some cases, aircraft 400 may include at least a pilot control. As used in this disclosure, a "pilot control," is an interface device that allows an operator, human or machine, to control a flight component of an aircraft. Pilot control may be communicatively connected to any other component presented in aircraft 400, the communicative connection may include redundant connections configured to safeguard against single-point failure. In some cases, a plurality of attitude datums may indicate a pilot's instruction to change heading and/or trim of an aircraft 400. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 400. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 408 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 4, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 408. At least a flight component 408 may include any propulsor as described herein. In embodiment, at least a flight component 408 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 4, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 4, at least a flight component 408 may include wings, empennages, nacelles, control surfaces, fuselages, and landing gear, among others, to name a few. In embodiments, an empennage may be disposed at the aftmost point of an aircraft body 404. Empennage may comprise a tail of aircraft 400, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 400 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 400 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 404 aircraft 400 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 408 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 408 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 400. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise—be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 400 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 4, aircraft 400 may include an energy source. Energy source may include any device providing energy to at least a flight component 408, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 4, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 404 of aircraft 400, for example without limitation within a wing portion 412 of blended wing body 408. Aviation fuels may include petroleum-based fuels, or petroleum and synthetic fuel blends, used to power aircraft 400. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 400. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 4, modular aircraft 400 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 4, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 4, aircraft 400 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 4, aircraft 400 may include multiple flight component 408 sub-systems, each of which may have a separate energy source. For instance, and without limitation, one or more flight components 408 may have a dedicated energy source. Alternatively, or additionally, a plurality of energy sources may each provide power to two or more flight components 408, such as, without limitation, a "fore" energy source providing power to flight components located toward a front of an aircraft 400, while an "aft" energy source provides power to flight components located toward a rear of the aircraft 400. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 408. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 4, aircraft 400 may include a flight component 408 that includes at least a nacelle 408. For the purposes of this disclosure, a "nacelle" is a streamlined body housing, which is sized according to that which is houses, such as without limitation an engine, a fuel store, or a flight component. When attached by a pylon entirely outside an airframe 404 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 400 partially or wholly enveloped by an outer mold line of the aircraft 400. At least a nacelle may be designed to be streamlined. At least a nacelle may be asymmetrical about a plane comprising the longitudinal axis of the engine and the yaw axis of modular aircraft 400.

With continued reference to FIG. 4, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 4, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 4, in nonlimiting embodiments, at least a flight component 408 may include an airbreathing engine such as a jet engine, turbojet engine, turboshaft engine, ramjet engine, scramjet engine, hybrid propulsion system, turbofan engine, or the like. At least a flight component 408 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 4, an aircraft 400 may include a flight controller. As used in this disclosure, a "flight controller" is a device that generates signals for controlling at least a flight component 408 of an aircraft 400. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 4, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 400 and/or computing device.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
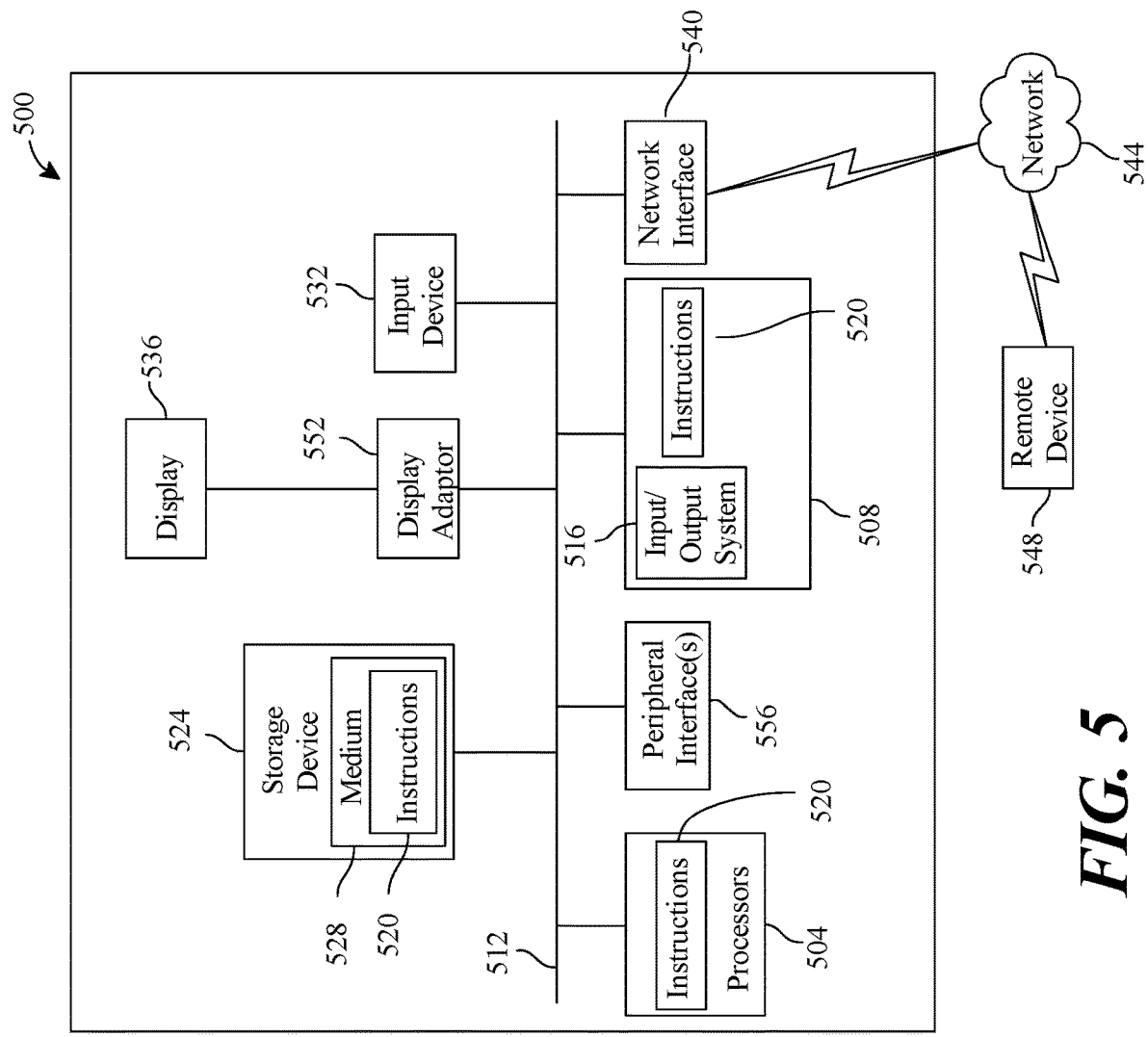
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556.

Examples of a peripheral interface include, but are not limited to, a serial port, a USB connection, a FIREWIRE connection, a parallel connection, and any combinations thereof.

Now referring to FIG. 6, an exemplary cabin according to the present disclosure is illustrated. Cabin 600 may have multiple channels defined by ribs 120 and or other structural members. In some embodiments, all channels in cabin 600 may have plurality of transparent panels 128. In some embodiments, cabin 600 may have more than two channels such that at least two channels are non-adjacent. In some embodiments and as shown in FIG. 6, non-adjacent channels may have plurality of transparent panels 128 in which the non-adjacent channels are adjacent to and separated by a channel that does not contain any transparent panels The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body aircraft comprising:
   a blended wing body, wherein the blended wing body is characterized by having no clear dividing line between wings and a main body along a leading edge of the aircraft;
   a cabin located within the main body and a transitional portion of the blended wing body wherein the cabin comprises a plurality of channels;
   a plurality of transparent panels in a ceiling of the cabin configured to transmit light from outside the blended wing body aircraft to inside the cabin, wherein the plurality of transparent panels are in included in the plurality of channels; and
   at least two of the channels that include panels of the plurality of transparent panels are separated by and adjacent to at least a channel of the plurality of channels that does not contain any transparent panels.

2. The aircraft of claim 1, wherein the ceiling further comprises at least a recess corresponding with a first transparent panel of the plurality of transparent panels.

3. The aircraft of claim 2 further comprising at least a retractable cover proximal the ceiling, wherein the at least a retractable cover is configured to cover the first transparent panel.

4. The aircraft of claim 1, wherein the plurality of transparent panels is configured to receive an electric current, wherein the plurality of transparent panels is configured to become translucent upon altering the electric current to the plurality of transparent panels.

5. The aircraft of claim 1, wherein the plurality of transparent panels further comprises a light emitting diode (LED) matrix.

6. The aircraft of claim 1, wherein the plurality of transparent panels form parallel rows.

7. The aircraft of claim 1 further comprising:
   at least a light configured to illuminate the cabin proximal at least a transparent panel of the plurality of transparent panels; and
   a controller configured to control the at least a light.

8. The aircraft of claim 1 further comprising:
   at least a recess in the ceiling corresponding with a first transparent panel of the plurality of transparent panels;
   at least a retractable cover proximal the ceiling configured to cover at least a portion of the first transparent panel; and
   a controller configured to control the retractable cover.

9. The aircraft of claim 1, wherein the plurality of transparent panels is configured to display images.

10. A blended wing body aircraft comprising:
    a blended wing body, wherein the blended wing body is characterized by having no clear dividing line between wings and a main body of the aircraft;
    a cabin located within the main body and a transitional portion of the blended wing body;
    a plurality of transparent panels in a ceiling of the cabin, wherein the plurality of transparent panels are configured to transmit daylight from outside the blended wing body aircraft to inside the cabin; and
    a plurality of channels in the cabin, wherein:
      the plurality of transparent panels are included in channels of the plurality of channels; and
      at least two of the channels that include panels of the plurality of transparent panels are separated by and adjacent to at least a channel of the plurality of adjacent channels that does not contain any transparent panels.

11. The aircraft of claim 10 further comprising a plurality [of] ribs in the main body and the transitional portion, wherein the plurality of channels are defined by the plurality of ribs.

12. The aircraft of claim 10, wherein the ceiling comprises at least a recess corresponding with a first transparent panel of the plurality of transparent panels.

13. The aircraft of claim 12 further comprising at least a retractable cover proximal the ceiling, wherein the at least a retractable cover is configured to cover the first transparent panel.

14. The aircraft of claim 10, wherein the plurality of transparent panels is configured to receive an electric current, wherein the plurality of transparent panels is configured to become translucent upon altering the electric current to the plurality of transparent panels.

15. The aircraft of claim 10, wherein the plurality of transparent panels comprises a light emitting diode (LED) matrix.

16. The aircraft of claim 10, wherein the plurality of transparent panels form parallel rows.

17. The aircraft of claim 10 further comprising:
    at least a light configured to illuminate the cabin proximal at least a transparent panel of the plurality of transparent panels; and
    a controller configured to control the at least a light.

18. The aircraft of claim 10 further comprising:
at least a recess in the ceiling corresponding with a first transparent panel of the plurality of transparent panels;
at least a retractable cover proximal the ceiling configured to cover at least a portion of the first transparent panel; and
a controller configured to control the retractable cover.

19. The aircraft of claim 10, wherein at least a transparent panel of the plurality of transparent panels is configured to display images.

* * * * *